(12) United States Patent
Randall

(10) Patent No.: US 7,293,244 B2
(45) Date of Patent: Nov. 6, 2007

(54) COMPUTING DEVICE WITH USER INTERFACE FOR NAVIGATING A CONTACTS LIST

(75) Inventor: Stephen Randall, London (GB)

(73) Assignee: Symbian Software Ltd. (GB)

( * ) Notice: Subject to any disclaimer, the term of this patent is extended or adjusted under 35 U.S.C. 154(b) by 512 days.

(21) Appl. No.: 10/451,708

(22) PCT Filed: Dec. 18, 2001

(86) PCT No.: PCT/GB01/05601

§ 371 (c)(1),
(2), (4) Date: Nov. 19, 2003

(87) PCT Pub. No.: WO02/50651

PCT Pub. Date: Jun. 27, 2002

(65) Prior Publication Data

US 2004/0113952 A1 Jun. 17, 2004

(30) Foreign Application Priority Data

Dec. 18, 2000 (GB) .................................. 0030699.3

(51) Int. Cl.
*G06F 3/00* (2006.01)
(52) U.S. Cl. .................... 715/784; 715/822; 715/829; 715/830; 715/831; 715/864
(58) Field of Classification Search ................ 715/822, 715/829–831, 784, 864
See application file for complete search history.

(56) References Cited

U.S. PATENT DOCUMENTS 5,283,864 A * 2/1994 Knowlton .................... 715/776
5,434,591 A 7/1995 Goto et al.
5,673,405 A 9/1997 Tange
5,680,312 A * 10/1997 Oshizawa et al. .......... 701/202
5,786,819 A * 7/1998 Weiser et al. ............... 715/840
2002/0089545 A1* 7/2002 Levi Montalcini .......... 345/784

FOREIGN PATENT DOCUMENTS

| EP | 0 844 553 A1 | 5/1998 |
| EP | 0 891 066 A2 | 1/1999 |
| JP | 04220716 A * | 8/1992 |

OTHER PUBLICATIONS

McFedries, Paul; The Complete Idiot's Guide™ to Windows® 95 Second Edition; 1997; Que; Second Edition; p. 68, 69, and 81-83.*
Borland, Russell; Ross, John; Introducing Microsoft Windows 98, Second Edition; 1998, Microsoft Press; p. 48.*
Johnson, D. K.; Morgan, S. A.; "Variable Rate Mouse-Driven List Scrolling" in IBM Technical Disclosure Bulletin; Jan. 1995; vol. 38 No. 1; p. 237-238.*

* cited by examiner

*Primary Examiner*—Tadesse Hailu
*Assistant Examiner*—Michael Roswell
(74) *Attorney, Agent, or Firm*—Synnestvedt Lechner & Woodbridge LLP

(57) ABSTRACT

A computing device comprises a display screen, the computing device is able to display on the screen a contact list automatically causes the relative prominence of one or more letters in one or more names to alter. For example, only the first letter of each name may be displayed; this facilitates fast scrolling through the contact list to the desired target.

14 Claims, 2 Drawing Sheets

COMPUTING DEVICE WITH USER INTERFACE FOR NAVIGATING A CONTACTS LIST

CROSS REFERENCE TO RELATED APPLICATIONS

This application claims the priority of PCT application Ser. No. PCT/GB01/05601 filed on Dec. 18, 2001 and British application GB 0030699.3 filed on Dec. 18, 2000, the contents of both of which are hereby incorporated by reference.

FIELD OF THE INVENTION

This invention relates to a computing device with a user interface for navigating a contacts list and in particular to interfaces that aid the speed and accuracy of navigating lists on small screen devices.

DESCRIPTION OF THE PRIOR ART

Computing devices, particularly mobile computing devices, are becoming the primary tool of interpersonal communication. The contact list stored in such devices is therefore a critical component: it is not unusual for people to use their mobile phones simply because their contacts are readily accessible in them. However, as mobile computing devices typically have display screens of limited size, navigating to a single contact name or number (or indeed any specific piece of information, such as a street name in a map or a word from a dictionary etc.) within a long choice list, is often tedious. For example, contact lists are often a single A-Z list, which can become very long. This leads to time consuming scrolling to the required entry, often in a situation in which a delay is very frustrating. Contact lists can also be sub-divided into groupings, such as A-F and G-L etc. A user then has to navigate to the top group and then scroll within a list which can still be quite long. Hence, selecting one phone contact out of a list of 100 contacts typically requires either more than 10 key presses or a long wait as the list is scrolled to the required entry.

Various attempts at improving menu accessibility by making more efficient use of the available screen 'real estate' have been proposed. For example, EP 0844553 to Philips Electronics NV proposes auto-removing items from a menu when they are either unavailable (because the user has locked them against use) or because the user does not use them with adequate frequency. U.S. Pat. No. 5,673,405 to Tokyo Seimitsu Co., Ltd. discloses a computer screen which can show only a single row of icons; because there are many more functions than can be accommodated in the single row, the icons associated with different functions are ordered into several rows. If a particular function is used very frequently, then it can be promoted to the row which is displayed as a default, so saving the user time in navigating down to it. The displayed menu row in effect becomes a list of functions which are the most commonly used. A similar approach of placing the most used functions into a particular menu list of the most commonly used functions is shown also in EP 891066 to Nokia Mobile Phones Ltd. Reference may also be made to U.S. Pat. No. 5,434,591 to Hitachi, Ltd., which shows a scrolling method in which scrolling over a map causing certain features of the map to be omitted for clarity. In common with the other cited art, this document does not however disclose any application to the problem of effectively scrolling through the long lists of names or words found in a contacts list.

On a more theoretical basis, an effective user interface enables the user to comprehend the changing internal status of the computing device as navigation proceeds. For example, to select or initiate a function (e.g. to open an address book function, enter a PIN security number or to alter the ring melody) a user has to understand (a) how to navigate to that function in order to select that function and (b) that the status of the telephone is such that the function can be selected or initiated. The technical problems of effectively (i) enabling the internal state to facilitate navigating through long contact lists and (ii) enabling the user to understand this changing internal state have to date been inadequately addressed. Directly correlated with the latter factor, effective understanding, is the ease and speed of navigation. The object of the present invention is to provide an improved form of user interface which addresses these technical problems.

SUMMARY OF THE PRESENT INVENTION

According to the invention there is provided a computing device comprising a display screen, the computing device being able to display on the screen a contact list of several names or words, in which the step of scrolling through the contact list automatically causes the relative prominence of one or more letters in one or more names or words to alter, wherein scrolling through the list of names automatically causes the relative prominence of one or more letters in one or more names in the contacts list to alter only where the scrolling speed exceeds a pre-defined threshold.

By altering the relative prominence in this way, fast scrolling to the target entry in the contacts list is facilitated. The relative prominence may alter by one or more of the following occurring:
  (i) the colour or grey scale level changing, with letters or numerals at or towards the front of a name or word being displayed in a more prominent colour or grey scale;
  (ii) the relative size changing, with letters or numerals at or towards the front of a name or word being displayed in a more prominent size;
  (iii) letters or numerals, excluding at least the first letter or numeral of a name or word, not being displayed in full;
  (iv) names or words, excluding at least the whole or part of the first name or word in a functional grouping of names or words, not being displayed in full.

In one implementation, the scrolling speed and/or scrolling duration determines which of options (i) to (iv), or combinations of these options, occur. Typically also, scrolling through the list of names automatically causes the relative prominence of one or more letters in one or more names in the contacts list to alter only where the contacts list is greater than a predefined length.

In addition, scrolling through the list of names may automatically cause the relative prominence of one or more letters in one or more names in the contacts list to alter only where the scrolling speed exceeds a pre-defined threshold. Hence, only as the scrolling velocity is increased by a user beyond a set level is the feature invoked; conversely, as the scrolling velocity drops below this level (e.g. as the target is approached), the contact list reverts to a normal representation of its names and words.

In another aspect, there is a computer program which, when running on a computing device, causes the computing device to operate as a computing device as defined above.

BRIEF DESCRIPTION OF THE DRAWINGS

The invention will be described with reference to the accompanying drawings in which.

DETAILED DESCRIPTION

As mobile phones become more functionally rich, they are frequently the main devices by which users store and access information. This is particularly true with contact information. It is not unusual for people to use their mobile phones simply because their contacts are readily accessible in them.

However, as mobile phones 10 typically have display screens 12 of limited size, navigating to a single contact name or number within a long choice list, is often tedious. As noted earlier, selecting one phone contact out of a list of 100 contacts often requires more than 10 key presses of for instance scroll up key 14 or scroll down key 16, or a long wait as the list is scrolled to the required entry.

An implementation of the present invention, referred to as ZoomScroll, proposes user interface improvements that can be made to small screen devices that dramatically aid the speed and accuracy by which users can navigate to a single piece of information that would typically be displayed within a long contacts list.

The maximum speed by which a user can assimilate scrolling data on a small screen is not limited by technology, but by the users' reaction time.

Figure 1:
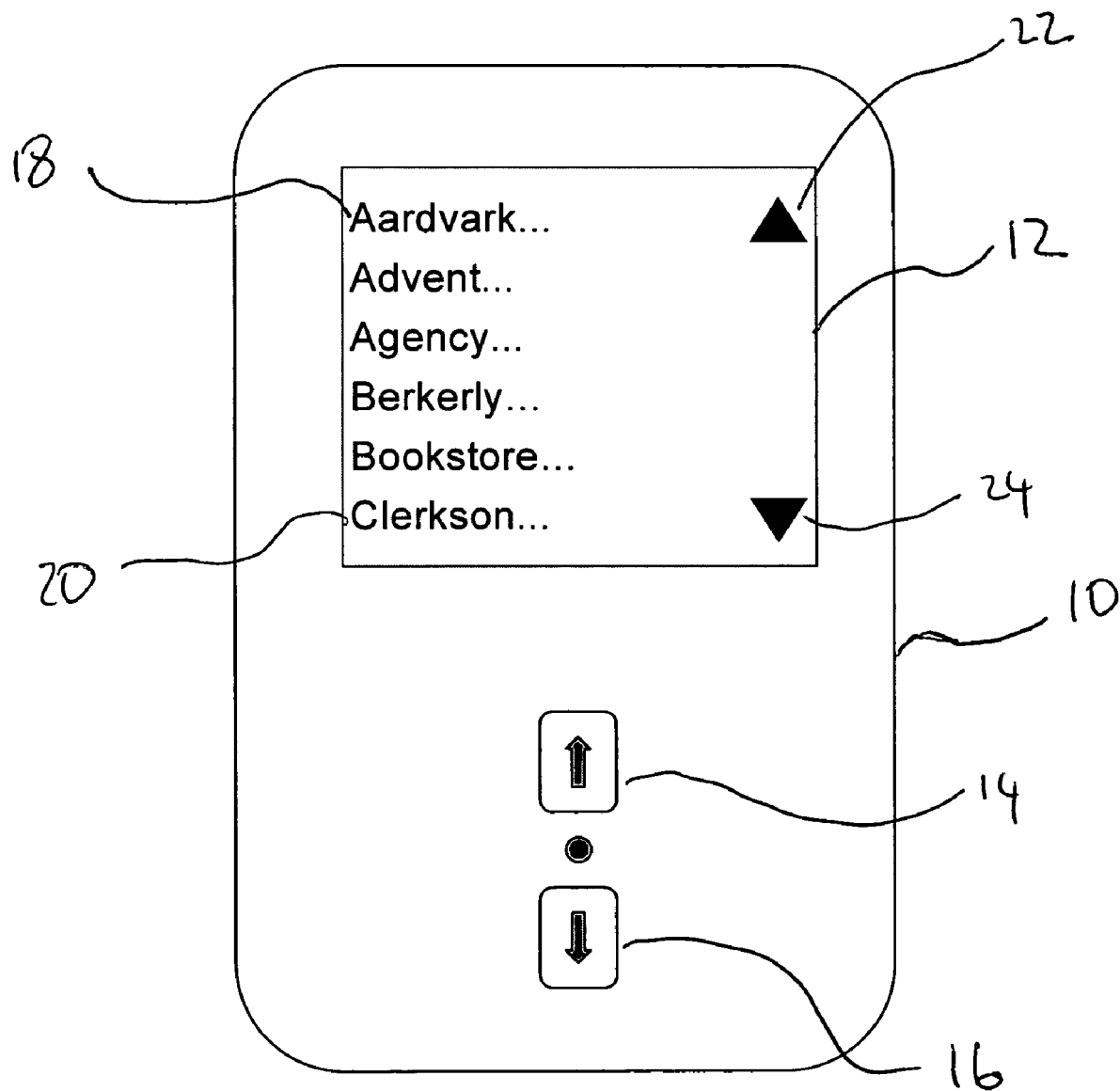
FIG. 1 is a schematic view of a mobile computing device, showing a conventional contact list.

In choosing a single contact from a list of 100 or more, a user would typically be faced with the start of the list 18 (Aardvark in FIG. 1 below) and, say, the next 5-6 entries, depending on the screen 12's size and resolution. If their required contact were somewhere in the middle of their list, they would have to scroll the equivalent of up to 10 screens to get near their entry.

System designers aid the user by speeding the scroll time whilst a scroll button 14, 16 or scroll icon 22, 24 remains selected. When the user nears their destination, they typically slow the speed down by letting go of the selected scroll button/key. They might then have to nudge the displayed list 20 up or down a few places before landing on their desired entry.

In conventional systems, speeding the scroll time beyond the capability of the user to absorb the information would only result in the user overshooting or undershooting their target contact. In other words, users of conventional systems are unable to easily navigate information within a fast moving list. However, the user's ability to assimilate information within such a fast moving list can be improved by emphasising "Signal" information and removing or de-emphasising "Noise" information from that list.

Signal in the context of scrolling, is any information that aids the users' navigation. For example, the user typically requires only the first few characters of a name to navigate up or down the list alphabetically. Those first few characters can be regarded as Signal characters and can be enhanced by making them bold.

Conversely, Noise, in the context of scrolling is any information that adds little or nothing to the users' navigation. All characters to the right of the Signal characters (assuming Western alphabets) are Noise and can be de-emphasised to aid navigation.

Figure 2:
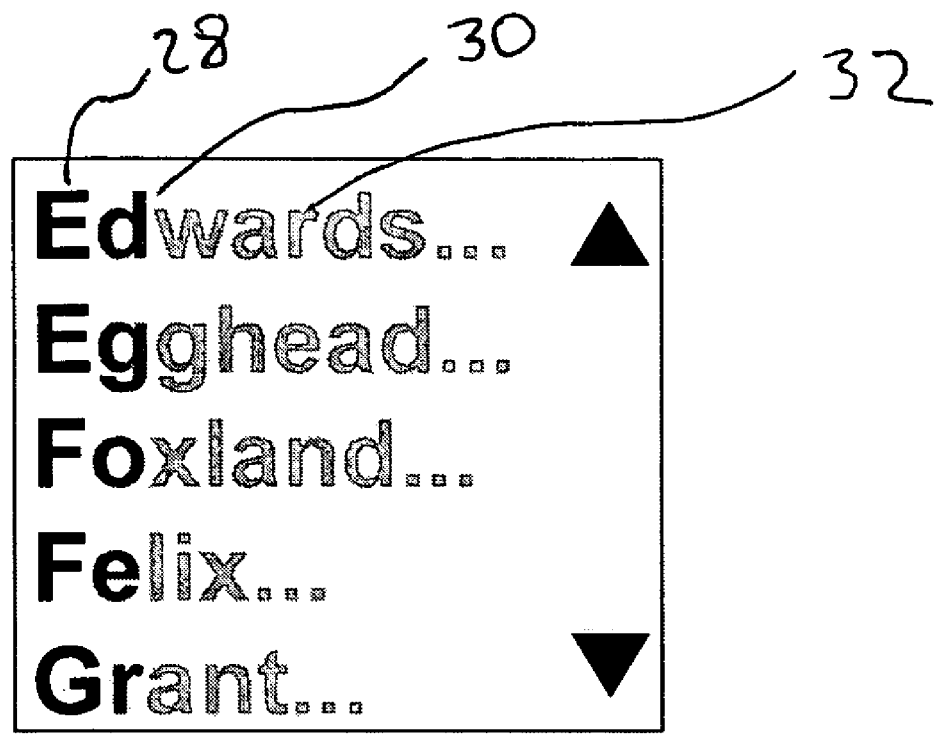
FIGS. 2 and 3 are views of the screen of a mobile computing device which implements the present invention.

FIG. 2 shows one implementation of the invention, where the first character 28 has been made bold, the second character 30 a lesser grey scale, whilst the Noise characters 32 have been greyed out.

Figure 3:
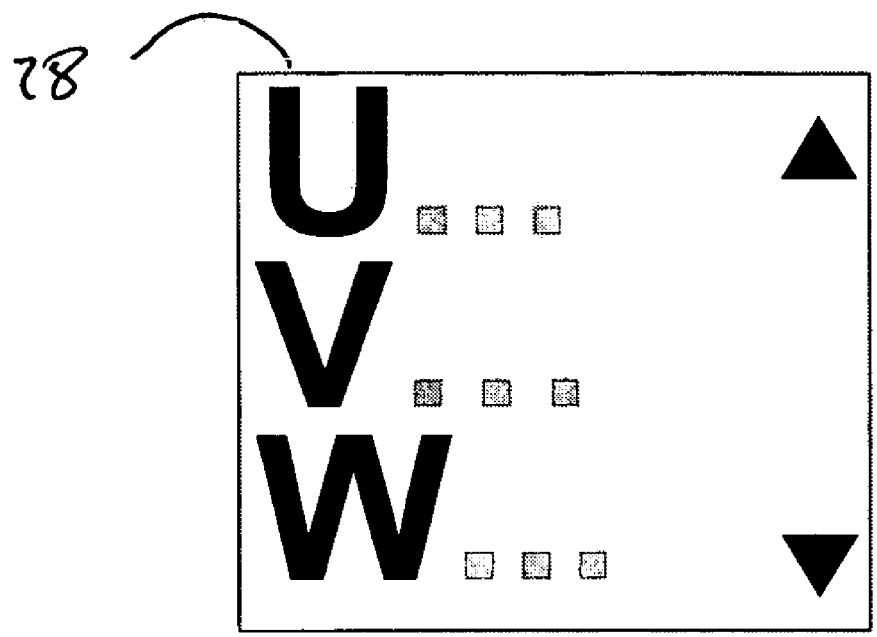

In addition, the font in FIG. 2 has been increased to help legibility. FIG. 3 shows an enhancement, whereby the font size of the first character 28 continues to be increased (i.e. the font increases as the user scrolls from FIG. 1, through FIG. 2 to FIG. 3). FIG. 3 also illustrates the absence of further noise characters 32, leaving only the emboldened first letter 28 of every entry.

Effective scrolling at a significantly increased scroll rate can be achieved using Zoom Scroll; the scrolling speed will usually be set to increase as a scroll continues, up to a pre-defined maximum. One useful feature of Zoom Scroll is the possibility of automatically reducing the scroll speed at or approaching pre-defined names or words in a list. For example, when scrolling through an A-Z alphabetical list of names, scrolling speed could be automatically set to reduce progressively as a name beginning with a new letter of the alphabet was approached, only to speed up again as soon as that name had been passed. This is similar to the way a car will slow down as a speed hump on a road is approached, only to speed up once it is passed.

The implementation could be tuned such that at maximum ZoomScroll, the zoom displays a single screen-sized character at a time. However, in terms of deciding how many zoom levels the system supports, it should be noted that it might not be desirable to store or display too large a font or too many fonts. The design decision will be weighed up along side memory requirements, software and processor capability as well as screen size. Furthermore, where lists are not long enough to justify ZoomScroll, (e.g. less than 2-3 screens in length) it could be automatically disabled or minimised.

ZoomScroll is not limited in application to contacts lists but can be applied to any ordered choice list, such as a street name in a map index or a word from a dictionary.

Hence, the term 'contacts list' used in this specification can be thought of as covering not only contact names which can provide contact data for a telephone dialer or e-mail etc. application, but in fact any ordered list of names or words presented to the user in a format through a user can scroll.

ZoomScroll can be optimised when used in conjunction with hardware controls that are able to detect harder or software pressure, but the system works perfectly well with standard membrane type keys.

The invention claimed is:

1. A computing device comprising a display screen, and a memory storing a list of several names or words, the computing device displaying on the screen a list including some of these names or words,
   in which the device is operable to scroll through the list at a speed that automatically increases as a scrolling action continues, and to automatically cause the relative prominence of at least the first letter in a name or word in the list to increase relative to the other letters in that name or word, if the scrolling speed exceeds a pre-defined threshold.

2. The computing device of claim 1 in which the device causes the relative prominence to alter by displaying at least the first letter in a more prominent colour or grey scale than the other letters.

3. The computing device of claim 1 in which the device causes the relative prominence to alter by displaying at least the first letter in a more prominent size than the other letters.

4. The computing device of claim 1 in which the device automatically causes the relative prominence of at least the first letter to increase relative to the other letters, only where the list is greater than a predefined length.

5. The computing device of claim 1 in which the device automatically causes the scrolling speed to decrease as a boundary within the list is approached.

6. The computing device of claim 5 in which the boundary is a new first letter.

7. The computing device as claimed in claim 1, being a mobile computing device.

8. A computer program which, when running on a computing device, causes the computing device to display on a screen a list of several names or words, and further automatically causes, when a user scrolls through the contact list, the relative prominence of one or more letters in one or more names or words to alter;

wherein the program automatically causes the scrolling speed to automatically increase as a scrolling action continues and to automatically cause the relative prominence of at least the first letter in a name or word in the list to increase relative to the other letters in that name or word, if the scrolling speed exceeds a pre-defined threshold.

9. A method of displaying a list of several names or words on a display of a computing device, comprising the steps of:

(a) scrolling through the list at a speed that automatically increases as a scrolling action continues;
 (b) automatically causing the relative prominence of at least the first letter in a name or word in the list to increase relative to the other letters in that name or word, if the scrolling speed exceeds a pre-defined threshold.

10. The method of claim 9 including the step of automatically causing the relative prominence to alter by at least the first letter being displayed in a more prominent colour or grey scale than the other letters.

11. The method of claim 9 including the step of automatically causing the relative prominence to alter by at least the first letter being displayed in a more prominent size than the other letters.

12. The method of claim 9 including the step of automatically causing the relative prominence of at least the first letter in the list to increase relative to the other letters, only where the list is greater than a predefined length.

13. The method of claim 9 including the step of automatically causing the scrolling speed to decrease as a boundary within the list is approached.

14. The method of claim 13 in which the boundary is a new first letter.

\* \* \* \* \*